United States Patent

Marechal et al.

(10) Patent No.: US 9,297,472 B2
(45) Date of Patent: Mar. 29, 2016

(54) ELECTRO-VALVE FOR DISCHARGING COMMON RAIL

(75) Inventors: Michel Marechal, Chouzy sur Cisse (FR); Frederic Sauvage, Beaugency (FR); Christophe Cardon, Saint Denis sur Loire (FR)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 142 days.

(21) Appl. No.: 14/126,009

(22) PCT Filed: Jun. 13, 2012

(86) PCT No.: PCT/EP2012/061182
§ 371 (c)(1),
(2), (4) Date: Feb. 14, 2014

(87) PCT Pub. No.: WO2012/171948
PCT Pub. Date: Dec. 20, 2012

(65) Prior Publication Data
US 2014/0175313 A1    Jun. 26, 2014

(30) Foreign Application Priority Data

Jun. 15, 2011  (EP) .................................. 11169945

(51) Int. Cl.
*F16K 31/12* (2006.01)
*F16K 31/06* (2006.01)
(Continued)

(52) U.S. Cl.
CPC ............ *F16K 31/0658* (2013.01); *F02M 61/12* (2013.01); *F02M 63/0007* (2013.01); *F02M 63/0015* (2013.01); *F02M 63/025* (2013.01); *F02M 63/0225* (2013.01)

(58) Field of Classification Search
CPC ............ F16K 31/0658; F16K 31/0662; F02M 63/0007; F02M 63/0225; F02M 63/025
USPC ......................... 251/48, 53, 129.07
See application file for complete search history.

(56) References Cited

U.S. PATENT DOCUMENTS 2,826,215 A * 3/1958 Wolfslau et al. ............ 137/454.6
3,737,141 A * 6/1973 Zeuner ..................... 251/129.07
(Continued)

FOREIGN PATENT DOCUMENTS

CN        1310294 A    8/2001
CN      101016950 A    8/2007
(Continued)

OTHER PUBLICATIONS

International Search Report dated Jul. 20, 2012.

*Primary Examiner* — Marina Tietjen
*Assistant Examiner* — Umashankar Venkatesan
(74) *Attorney, Agent, or Firm* — Thomas H. Twoney

(57) ABSTRACT

An electro-valve for discharging a common rail while maintaining a minimum pressure, comprising an electro-magnetic coil inside which is arranged a movable plunger, controlling the displacements of a movable axis engaging a ball valve, said movable plunger being urged in the closing position of the ball valve by a spring housed inside a bearing cap, wherein a bottom wall of the bearing cap surrounds an external surface of the movable plunger, wherein a clearance between the external surface of the plunger and an internal wall of the bearing cap is filled with a film of fuel, the opening movement of the plunger causing the fuel to flow from a room situated on top of the plunger to a bore in which the axis is arranged, wherein a sleeve of a controlled thickness is arranged around the plunger within the clearance to set the thickness of said film of fuel.

5 Claims, 2 Drawing Sheets

(51) Int. Cl.
*F02M 61/12* (2006.01)
*F02M 63/00* (2006.01)
*F02M 63/02* (2006.01)

(56) References Cited

U.S. PATENT DOCUMENTS

| | | | |
|---|---|---|---|
| 4,638,974 A * | 1/1987 | Zeuner et al. | 251/129.15 |
| 4,731,914 A * | 3/1988 | Zeuner et al. | 29/890.128 |
| 5,722,633 A * | 3/1998 | Goossens et al. | 251/129.15 |
| 6,502,553 B2 | 1/2003 | Banzhaf | |
| 6,959,907 B2 * | 11/2005 | Hironaka | 251/50 |
| 7,578,494 B2 | 8/2009 | Mitsumata et al. | |
| 8,826,889 B2 | 9/2014 | Roth | |
| 2004/0251441 A1* | 12/2004 | Schmitt et al. | 251/129.07 |
| 2005/0076955 A1* | 4/2005 | Boehland et al. | 137/539.5 |
| 2008/0290305 A1* | 11/2008 | Akabane | 251/65 |
| 2009/0200405 A1 | 8/2009 | Yoshimaru et al. | |
| 2010/0018501 A1 | 1/2010 | Bitter et al. | |
| 2015/0041694 A1* | 2/2015 | Nanahara et al. | 251/129.18 |

FOREIGN PATENT DOCUMENTS

| | | |
|---|---|---|
| CN | 100453797 C | 1/2009 |
| CN | 101903642 A | 12/2010 |
| EP | 0 267 162 A2 | 5/1988 |
| EP | 0 990 791 A1 | 4/2000 |
| EP | 1 408 388 A1 | 4/2004 |
| EP | 1 557 597 A1 | 7/2005 |
| JP | 2002-286137 A | 10/2002 |
| JP | 2004 011448 A | 1/2004 |
| JP | 2006-138397 A | 6/2006 |
| JP | 2007-32483 A | 2/2007 |
| JP | 2007-56964 A | 3/2007 |
| JP | 2007-132222 A | 5/2007 |
| JP | 2008-525697 A | 7/2008 |
| JP | 2009-216081 A | 9/2009 |

* cited by examiner

ELECTRO-VALVE FOR DISCHARGING COMMON RAIL

CROSS REFERENCE TO RELATED APPLICATIONS

This application is a national stage application under 35 U.S.C. 371 of PCT Application No. PCT/EP2012/061182 having an international filing date of 13 Jun. 2012. which designated the United States, which PCT application claimed the benefit of European Patent Application No. 11169945.0 filed 15 Jun. 2011. the entire disclosure of each of which are hereby incorporated herein by reference.

FIELD OF THE INVENTION

The invention relates to a fuel delivery system for an internal combustion engine.

BACKGROUND

A type of known fuel injection system for an internal combustion engine comprises a high pressure pump, a common rail and a plurality of fuel injectors, each of which is associated with a respective combustion chamber of the engine.

The high pressure pump is arranged to receive fuel at low pressure from a fuel supply, such as a vehicle fuel tank, and to pump fuel at high pressure, e.g. 2000 bar, into the common rail. The common rail feeds each of the plurality of fuel injectors with fuel at high pressure.

It is known to control the delivery of fuel at a high pressure to the common rail by means of an electro-valve (Flow metering valve) situated on the pump low pressure side. A second electro-valve situated at one end of the High pressure common rail serves to discharge the common rail when a rapid deceleration of the engine occurs or when the pressure in the rail exceeds the system pressure demand, while maintaining a minimum pressure, or to discharge the common rail when the engine is at stop and to help heating the fuel for a cold start.

Such known device comprises a valve comprising a ball carried by a movable longitudinal axis at one end, the other end of said movable axis being attached to a movable plunger actuated by an electro-magnetic coil, said movable plunger being placed, at least partially, inside a magnetic bearing cap.

A large clearance is arranged between the movable plunger and the surrounding magnetic cap, said clearance being filled with fuel, in order to lubricate the displacements of the movable plunger inside the cap.

However, in reality the large fuel gap between plunger and cap leads to uncontrolled dynamic motion of plunger and loss of magnetic force. Without damping, there are instabilities in pressure control, back leak pressure spikes and associated noise of the system.

An object of the present invention is to suppress such drawbacks.

SUMMARY

In an embodiment, the invention provides an electro-valve for discharging a common rail while maintaining a minimum pressure, comprising an electro-magnetic coil inside which is arranged a bearing cap and a movable plunger, said movable plunger controlling the displacements of a movable axis engaging a ball or needle of the valve, said movable plunger being urged by a spring housed inside the bearing cap, wherein a bottom wall of the bearing cap surrounds an external surface of the movable plunger, wherein a clearance between the external surface of the plunger and an internal wall of the bearing cap is filled with a film of fuel, the opening movement of the plunger causing the fuel to flow from a room situated on top of the plunger to a bore in which the axis is arranged, wherein a sleeve of a controlled thickness is arranged around the plunger within the clearance to set the thickness of said film of fuel, the pressure being controlled by the association of the ball or needle with a seat of the valve wherein the sleeve is arranged against the external surface of the plunger, wherein a passage between the external surface of the sleeve and the internal wall of the bearing cap constitutes a restricted passage for a flow of fuel between the room and the bore, or wherein the sleeve is arranged against the internal surface of the bearing cap, wherein a passage between the internal surface of the sleeve and the external wall of the plunger constitutes a restricted passage for a flow of fuel between the room and the bore.

According to embodiments, such electro-valve can comprise one or more of the features below.

The longitudinal axis may have any sectional shape e.g. a circular, hexagonal or trilobic section and/or some flat surfaces.

In an embodiment, an additional drilling is provided through a valve body from a seat cavity of the valve to a plunger cavity.

A conduct may be drilled through the plunger to constitute a second restricted passage.

The plunger may have any sectional shape e.g. a circular, hexagonal or a trilobic section and/or may have some flat surfaces. In an embodiment, the plunger has a different cross-sectional shape from the internal wall of bearing cap, so that first portions of the circumference of the sleeve are in sliding contact with the internal wall of the bearing cap or external surface of the plunger to guide the plunger in the bearing cap, and second portions of the circumference of the sleeve are spaced from the internal wall of the bearing cap or external surface of the plunger to create restricted passages for fluid communication between the room and the bore.

In an embodiment, the spring causes the plunger to rest against an end of the axis to urge the axis in a closing position of the valve for natural pressure operations. In an alternative embodiment, the spring causes the plunger to rest against an end wall of the bearing cap opposite to the axis for venting pressure operations. The spring may be arranged in a recess of a valve body around the axis.

The sleeve surrounding the plunger is preferably made of non magnetic material having good sliding characteristics.

The sleeve surrounding the plunger has a tunable thickness in order to control the fluid film thickness between the sleeve and the plunger.

The magnetic cap is deep drawn which reduces manufacturing costs and is easier to manufacture.

The pressure may be controlled by means of the association of the ball and its seat or by a needle valve instead of a ball and its seat.

In an embodiment, the sleeve comprises a coating on the surface of the plunger or on the surface of the bearing cap.

In an embodiment, the sleeve comprises a coating on the surface of a tube placed in extension to a lateral wall of the bearing cap.

Aspects of the invention are based on the idea of arranging a non-magnetic sleeve or foil with low friction properties located between plunger and cap of a high pressure valve which controls both pressure and flow. The sleeve reduces friction and provides a centering effect and thus minimizes side forces. Sleeve thickness can be adjusted to control damping of the motion of the plunger. The sleeve material may be non-magnetic metal, PTFE or a coating on steel. There may additionally be a drilling through the movable plunger, in order to tune the damping more effectively.

BRIEF DESCRIPTION OF THE DRAWINGS

These and other aspects of the invention will be apparent from and elucidated with reference to the embodiment described hereinafter, by way of example, with reference to the drawings.

DETAILED DESCRIPTION OF THE EMBODIMENTS

Figure 1:
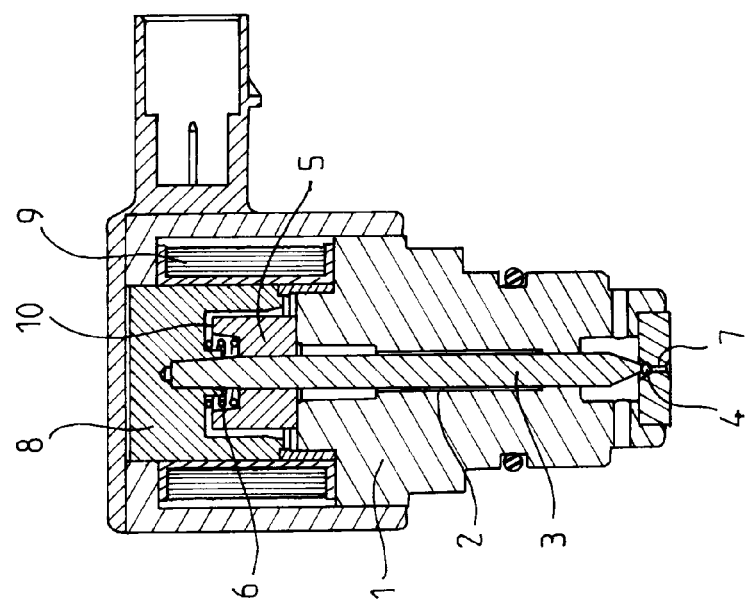
FIG. 1 is a longitudinal section of a prior art embodiment of an electro-valve.
Figure 3:
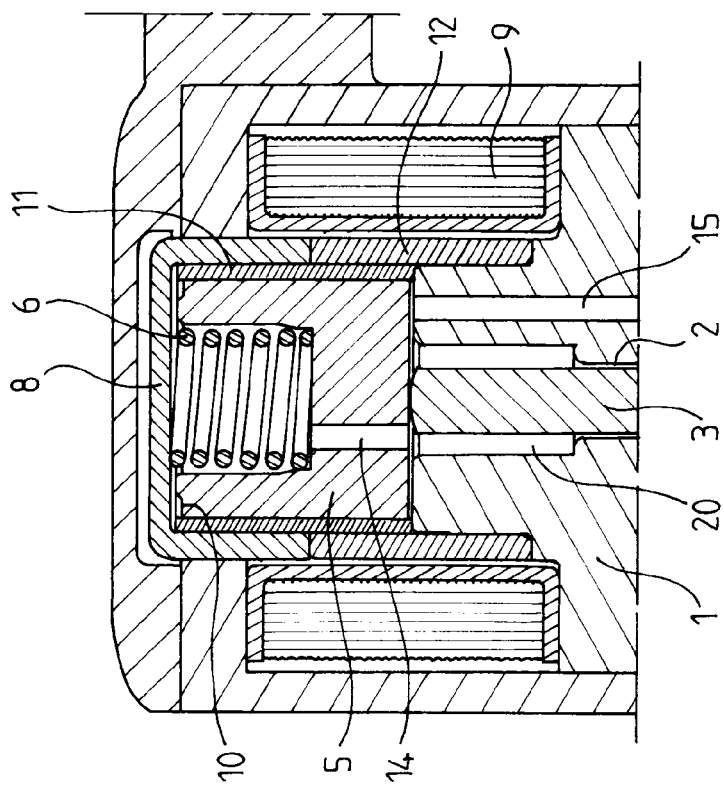
FIG. 3 is a partial view, at an enlarged scale of FIG. 2.

With reference to FIG. 1, the known embodiment to be improved comprises a valve body 1 having an internal longitudinal bore 2 within which may move a longitudinal axis 3. The small clearance between bore 2 and axis 3 is filled with fuel.

The axis 3 comprises at one end a ball 4 resting on the opening of a conduit 7 and is fixed to the plunger 5 at its other end.

A spring 6 is pushing downward the plunger 5 in such a way that ball 4 is maintained closing the opening of conduit 7. Conduit 7 is arranged through an end plug of a common rail to allow discharging the common rail to a fuel tank (not shown).

Spring 6 is held by bearing cap 8 which is partially surrounding plunger 5 with a gap or clearance filled with fuel.

This clearance is large enough to allow free movement of the plunger.

The electro-magnetic coil 9 is energized to decrease the force applied onto the ball downwards. When coil 9 reduces the force applied onto the ball, the fluid pressure is released through the seat towards the fuel tank. Such plunger motion needs to be controlled to avoid oscillation generating loss of control of the pressure drop.

However it appeared, during use, that displacement of the movable plunger 5 may be jammed.

Moreover, since axis 3 is guided axially in the head part of the valve in its top end and in the lower part of the valve in the lower end of bore 2, and since the middle portion of axis 3 is fixed to the plunger 5, the valve arrangement of FIG. 1 requires an excellent concentricity between the valve body 1 and the valve head part which increases manufacturing cost.

Figure 2:
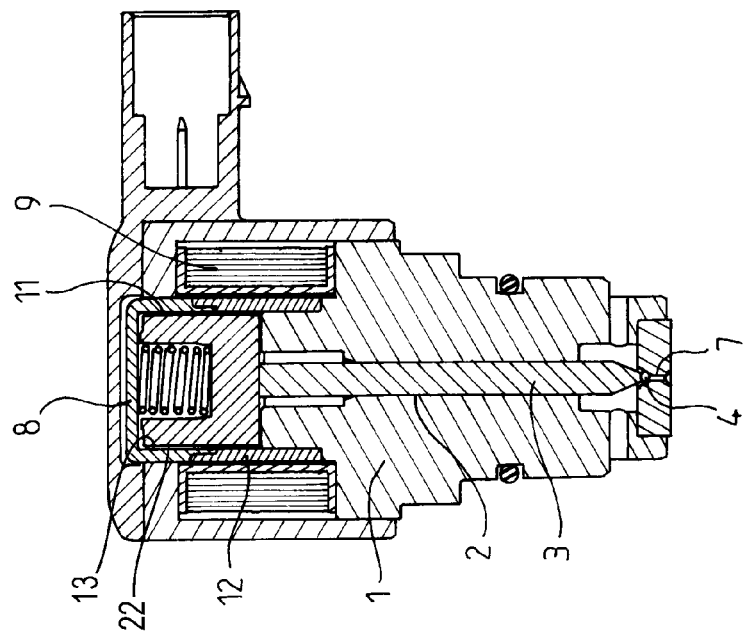
FIG. 2 is a longitudinal section of an embodiment according to the present invention.

FIG. 2 is showing the improved embodiment. In this FIG. 2 same elements as in FIG. 1 are bearing the same references.

In this embodiment plunger 5 is not anymore fixed to longitudinal axis 3 but is simply resting on it by action of spring 6, thus suppressing one cause of jamming of the plunger 5.

Another modification is that the external surface 22 of plunger 5 is covered by a sleeve 11 of non-magnetic material having good friction characteristics, such as nylon or PTFE, whose thickness is tunable in order to determine exactly the thickness of the film of fuel between the movable plunger 5 and the internal wall 13 of cap 8.

Another sleeve 12 made of non magnetic material is placed in extension to the lateral walls of cap 8.

Figure 4:
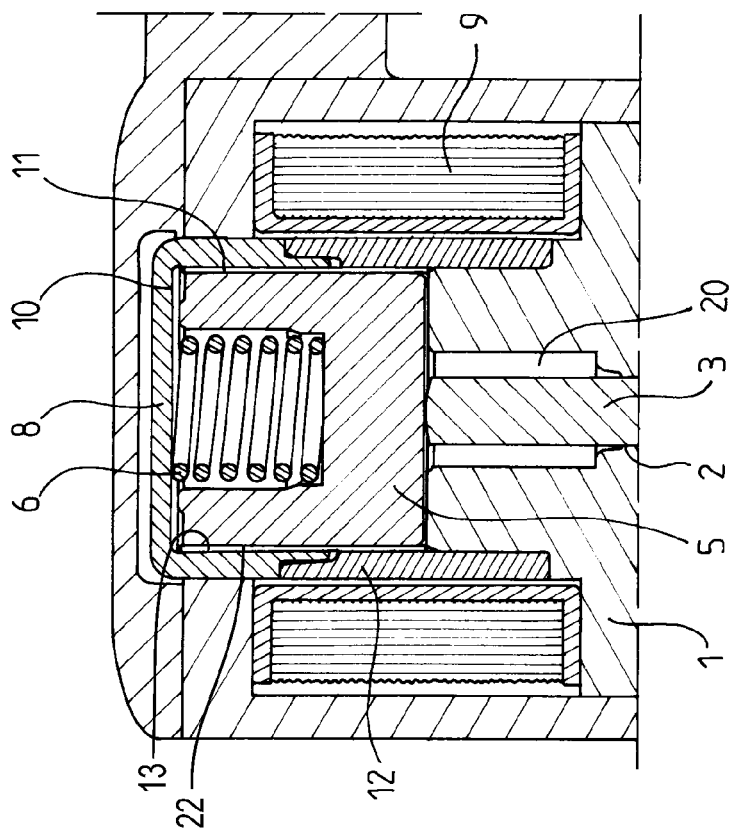
FIG. 4 is a modification of the embodiment of FIG. 3.

Guiding of longitudinal axis 3 within bore 2 is obtained by the length of axis 3. To achieve the guiding of axis 3, the cross section of axis 3 may be well adjusted to a corresponding cross section of bore 2, e.g.; both circular in shape. In that case, the space available for fluid communication through the bore 2 may be insufficient for proper operations of the valve. As shown on FIG. 4, an additional drilling 15 of equilibration may be provided through valve body 1 to ensure fluid communication between the valve seat and the cavity containing plunger 5 in bearing cap 8.

In an alternative embodiment, the cross section of axis 3 does not coincide with the cross section of bore 2, so that some space remains around axis 3 for fluid communication through bore 2. For example, the bore 2 may have a circular cross-section whereas axis 3 has a hexagonal or trilobic cross-section. When plunger 5 is moved up against spring 6, there is a flow of the fuel in the film of fuel existing between the external wall of plunger 5 and the internal wall of cap 8 towards bore 2.

The said flow is controlled by the thickness of the film of fuel the thickness of which is determined by the importance of the space between the external 22 wall of plunger 5 and the internal wall 13 of cap 8 and therefore by the thickness of sleeve 11, which can be precisely controlled and selected.

In an embodiment, the cross-section of plunger 5 has the same shape as the internal space of bearing cap 8, e.g. both circular, so that a film of fuel with substantially uniform thickness exists all around the plunger 5.

In a preferred embodiment, the cross-section of plunger 5 has a different shape from the internal space of bearing cap 8, e.g. an hexagonal plunger in a circular space or other, so that at some portions of the circumference of the plunger 5 the sleeve 11 is in sliding contact with the internal wall 13 of bearing cap 8 to provide axial guiding of the plunger 5, while at other portions of the circumference of the plunger 5, the sleeve 11 is spaced from the internal wall 13 of bearing cap 8 to create restricted passages for fluid communication between the room 10 and the bore 2.

Flow control could be also realized by drilling an additional conduit 14 of precisely determined diameter connecting bore 2 and the housing of spring 6 which communicates with room 10 situated above plunger 5.

In another embodiment, the spring 6 is replaced by a similar spring arranged on the opposite side of the plunger 5, e.g. within a recess 20 of valve body 1 around the end portion of axis 3. In that case, as long as the coil 9 is not energized, the spring urges the plunger 5 towards the bearing cap 8 at some distance from the end of axis 3, thus leaving the axis 3 and ball 4 to float between an open and a closed state depending on pressure conditions existing in the common rail. In that case, at rest, the flow rate through the valve is only controlled by the diameter of the conduct 7.

Due to the fact that the upper end portion of axis 3 is not attached to plunger 5, the length of axis 3 can be reduced and a concentricity requirement between valve body 1 and valve head part 21 can be relaxed compared to the embodiment of FIG. 1.

In an embodiment, sleeve 11 is arranged against the internal surface of the lateral wall of bearing cap 8 instead of the external surface of plunger 5. The function of the sleeve 11 remains the same in that case.

The sleeve 11 can be made independently from the other parts of the valve, e.g. under the form of a foil of PTFE and inserted in the valve during assembly. Alternatively, the sleeve 11 can be made as a preexisting coating on the surface of plunger 5 or bearing cap 11, e.g. obtained by spraying the sleeve material on the surface before assembly.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. An electro-valve for discharging a common rail while maintaining a minimum pressure, comprising an electromagnetic coil inside which is arranged a bearing cap and a movable plunger, said movable plunger controlling the displacements of a movable axis engaging a ball or needle, said movable plunger not fixed to said movable axis but being urged by a spring housed inside the bearing cap toward said movable axis, wherein the bearing cap surrounds an external surface of the movable plunger so that said movable axis floats between an open and closed state, and wherein a clearance between the external surface of the plunger and an internal wall of the bearing cap is filled with a film of fuel, the opening movement of the plunger causing the fuel to flow from a room situated on top of the plunger to a bore in which the axis is arranged, wherein a sleeve of a controlled thickness is arranged around the plunger within the clearance to set the thickness of said film of fuel, the pressure being controlled by the association of the ball or needle with a seat of the valve characterized in that the sleeve is arranged against the external surface of the plunger, wherein a passage between the external surface of the sleeve and the internal wall of the bearing cap constitutes a restricted passage for a flow of fuel between the room and the bore, or wherein the sleeve is arranged against the internal surface of the bearing cap, wherein a passage between the internal surface of the sleeve and the external wall of the plunger constitutes a restricted passage for a flow of fuel between the room and the bore.

2. An electro-valve according to claim 1, wherein a conduit drilled through the plunger constitutes a second restricted passage regulating the flow of fuel.

3. An electro-valve according to claim 1, wherein an additional drilling is provided through a valve body from a seat cavity of the valve to a plunger cavity.

4. An electro-valve according to claim 1, wherein the spring causes the plunger to rest against an end of the axis to urge the axis in a closing position of the valve.

5. An electro-valve according to claim 1, in which the sleeve comprises a coating on the surface of the plunger or on the surface of the bearing cap.

\* \* \* \* \*